(12) United States Patent
Ergen et al.

(10) Patent No.: US 8,295,196 B2
(45) Date of Patent: Oct. 23, 2012

(54) METHOD FOR TRANSMITTING INFORMATION PACKETS WITHIN AN ASYNCHRONOUS WIRELESS COMMUNICATION NETWORK AND NETWORK NODE IMPLEMENTING IT

(75) Inventors: Sinem Coleri Ergen, Berkley, CA (US); Claudio Borean, Turin (IT); Roberta Giannantonio, Turin (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 52 days.

(21) Appl. No.: 12/679,226

(22) PCT Filed: Sep. 19, 2007

(86) PCT No.: PCT/EP2007/008157
§ 371 (c)(1),
(2), (4) Date: Oct. 25, 2010

(87) PCT Pub. No.: WO2009/036786
PCT Pub. Date: Mar. 26, 2009

(65) Prior Publication Data
US 2011/0128869 A1 Jun. 2, 2011

(51) Int. Cl.
*H04J 1/16* (2006.01)
(52) U.S. Cl. .......... 370/252; 370/350; 455/502
(58) Field of Classification Search ............ 370/252, 370/311, 329, 338, 341, 347, 345, 350, 503; 455/502, 574
See application file for complete search history.

(56) References Cited

U.S. PATENT DOCUMENTS 7,701,923 B2 * 4/2010 Kuehner ............ 370/350
2008/0240163 A1 * 10/2008 Ibrahim et al. ........... 370/503

OTHER PUBLICATIONS

Buettner et al.; "X-MAC: A Short Preamble MAC Protocol for Duty-Cycled Wireless Sensor Networks", SenSys 2006, Technical Report CU-CS-1008-06, pp. 1-11, (2006).
El-Hoiydi et al.; "WiseMAC: An Ultra Low Power MAC Protocol for Multi-hop Wireless Sensor Networks", ALGOSENSORS 2004, LNCS, vol. 3121, XP019008766, pp. 18-31, (2004).
Hong et al.; "Time Synchronization in Wireless Sensor Network Applications", SEUS 2007, LNCS 4761, XP-002489329, pp. 429-435, (2007).
European Search Report for International Application No. PCT/EP2007/008157, mailing date Aug. 6, 2008.

* cited by examiner

*Primary Examiner* — Ricky Ngo
*Assistant Examiner* — Kan Yuen
(74) *Attorney, Agent, or Firm* — Finnegan, Henderson, Farabow, Garrett & Dunner, L.L.P.

(57) ABSTRACT

A source node estimates not only the schedule time offset of the destination node but also the clock drift of the destination node. In this way, the source node may choose very accurately the transmission start time of an information packet to this destination node so that typically only one very short preamble needs to be transmitted. The estimation of time offset and clock drift between two nodes is achieved through tone or more previous transmissions between these two nodes, in particular, information relating to these parameters is transmitted from the destination node to the source node in reply to a preamble transmitted by the source node to the destination node.

21 Claims, 10 Drawing Sheets

| Neighbor ID | period | $w_1$ | | $w_2$ | | ... | $w_K$ | |
|---|---|---|---|---|---|---|---|---|
| ... | ... | | | | | | ... | |
| n | P | $\hat{t}_w^1$ | $t_w^1 - t_w^2$ | $\hat{t}_w^2$ | $t_w^2 - t_w^3$ | ... | $\hat{t}_w^K$ | $t_w^K - t_w^{K+1}$ |
| ... | ... | | | | | | ... | |

Fig.7

| $t_{d,rec}^1$ | $t_w^1 - t_w^2$ | P |
|---|---|---|

Fig.8

METHOD FOR TRANSMITTING INFORMATION PACKETS WITHIN AN ASYNCHRONOUS WIRELESS COMMUNICATION NETWORK AND NETWORK NODE IMPLEMENTING IT

CROSS REFERENCE TO RELATED APPLICATION

This application is a national phase application based on PCT/EP2007/008157, filed Sep. 19, 2007, the content of which is incorporated herein by reference.

FIELD OF THE INVENTION

The present invention relates to a method for transmitting an information packet from a first node to a second node within an asynchronous wireless communication network and to a network node implementing it.

BACKGROUND OF THE INVENTION

WPAN [Wireless Personal Area Network] networks are known for some years; a PAN [Personal Area Network] network can be defined as a computer network for communicating among devices close to one person; a WPAN network is a PAN network using wireless short-range communication technologies.

A communication technology which is very often used for implementing a WPAN network is ZigBee.

One of the main and recent applications of WPAN networks is WSN [Wireless Sensor Network] networks.

In a WPAN network the key components are the nodes of the network, also called devices. In general, a WPAN network may comprise a mixture of mains powered devices and battery powered devices; battery powered devices are designed to limit their power consumption so to assure a long lifetime to their batteries. Providing efficient use of energy in WSN networks is particularly important in order to achieve long-term deployment of applications since the sensor network nodes may not be easily recharged or replaced when the energy of their battery is over.

The component of a node of a WPAN network which is primarily responsible for power consumption is the radio transceiver (both when it transmits and when it receives); the typical way of reducing power consumption in an asynchronous WPAN network (a network wherein the nodes do not have a synchronized clock and therefore do not transmit and receive synchronously) is to use "duty-cycling", i.e. to let the radio transceiver of the devices operate intermittently for short intervals of times; in this way, the operation of each node is a periodic (fixed transceiver operation period) sequence of (short) awake intervals and (long) sleep intervals. Of course, this complicates the communication protocols used in WPAN networks.

From the prior art, there are also known asynchronous WSN networks wherein all (or almost all) the nodes are battery powered and therefore are designed to limit power consumption and wherein special MAC protocols are used to limit power consumption of the radio transceivers.

The article by M. Buetter et al, "X-MAC: A Short Preamble MAC Protocol for Duty-Cycled Wireless Sensor Networks", SenSys 2006, 1-3 Nov. 2006, Boulder, Colo., USA, describes in detail one of such MAC protocols called "X-MAC" based on a fixed-length preamble. According to this protocol, when a source node has to transmit an information packet, its transmitter transmits a series of short and fixed-length preambles, each containing the address of the destination node; small pauses between preambles permit the receiver of the destination node to awake (according to its own internal operation schedule) and to send an acknowledgment that stops the sequence of preambles and signals the availability of the destination node to receive data, i.e. the payload of information packet; non-destination receivers which overhear the strobed preambles can go back to sleep immediately, rather than remaining awake for receiving data.

The article by A. El-Hoiydi and J. Decotignie, "WiseMAC: An Ultra Low Power MAC Protocol for Multi-hop Wireless Sensor Networks", in Proceedings of the First International Workshop on Algorithmic Aspects of Wireless Sensor Networks, Lecture Notes in Computer Science, LNCS 3121, pp. 18-31, Springer-Verlag, July 2004, describes in detail another of such MAC protocols called "WiseMAC" based on a variable-length preamble. According to this protocol, the operation schedule of a node's direct neighbours is first learned and then used for minimizing the size of a variable-length preamble of an information packet to be transmitted; acknowledgments are not only used to signal the reception of a data packet by a destination node, but also to inform the source node of the remaining time until its next wake-up instant; in this way, a node can keep a table of schedule time offsets of all its usual destinations up-to-date; using this information, a node may transmit an information packet just at the right time, with a preamble of minimized size. According to this article, the duration of the preamble must cover the potential clock drift between the clocks at the source node and at the destination node; this drift is proportional to the time since the last acknowledgement was received by the source node, i.e. since the last transmission from the source node to the destination node; the required duration TP of the preamble is given by $$TP = \min(4\theta L, TW)$$

wherein $\theta$ is the frequency tolerance of the quartz used for generating the clock signals at the nodes, L is the time interval between transmissions, TW is the fixed period of the schedule of the nodes of the network and "min" is a function that determines the "minimum".

SUMMARY OF THE INVENTION

The Applicant has considered that in wireless communication networks, especially in WPAN/WSN networks, there is a need to decrease further the power consumption of network nodes with respect to known protocols at least for the following reasons.

In the case of present X-MAC, a number of fixed-length preambles generally needs to be transmitted; in fact, in order to save power the transceiver operation period should be rather long (e.g. some seconds) and the awake interval should be very short (e.g. some milliseconds), but the longer is the period the higher is the number of preambles that need to be transmitted before the node awakes and detects a preamble and therefore an information packet directed to it.

In the case of WiseMAC, a long variable-length preamble need generally to be transmitted; in fact, in order to save power the transceiver operation period should be rather long (e.g. some seconds) and the awake interval should be very short (e.g. some milliseconds), and in these wireless communication networks (especially in WSN networks) transmissions of information packets between two nodes are not very frequent and quartz are not very precise, therefore the required duration of the preamble (TP in the above formula)

is quite long and tends to be close to the transceiver operation period (TW in the above formula).

Additionally, the Applicant has considered that a protocol based on fixed-length preambles is preferable as it allows a better organization of the communication applications according to hierarchic layers. In fact, if a variable-length preamble is to be managed, the received and transmitted raw bit streams, i.e. low level data, need to be known and monitored by high-level primitives in order to be able to detect the preamble during its transmission (receiver side) and to interrupt the transmission of the preamble when necessary (transmitter side).

Therefore, the general technical problem behind the present invention is how to reduce further power consumption of network nodes in an asynchronous wireless communication network through an appropriate communication method.

More in particular, the present invention aims at finding a solution based on the use of a fixed-length preamble.

In order to solve the above mentioned problems, the Applicant has conceived that in order to improve transmissions of information packets a source node estimates not only the schedule time offset of the destination node but also the clock drift of the destination node; in this way, the source node may choose very accurately the transmission start time of an information packet to this destination node so that typically only one very short preamble needs to be transmitted.

Therefore the present invention achieves a result in term of power consumption close to that of synchronous wireless communication networks, but through a simpler solution that does not require synchronization of all clock signals of the nodes of the network.

Additionally, the present invention may take into account different transceiver operation periods in different nodes of the network.

The estimation of time offset and clock drift between two nodes is achieved through one or more previous transmissions between these two nodes; in particular, information relating to these parameters are transmitted from the destination node to the source node in reply to a preamble transmitted by the source node to the destination node. Such reply may also contain information relating to the transceiver operation period of the destination node.

All the received synchronization information or information derived therefrom may be stored into a table within the source node wherein a row of data is provided for all or main neighbouring nodes.

Estimations are more accurate if they are based on a number of previous transmissions.

In order to take into account confidence in the estimations, an advance of time may be provided at the transmission time; such advance of time may be reduced if a number of previous transmissions is used for estimations.

According to another aspect, the present invention also relates to a network node arranged in such a way as to be particularly suitable for implementing the communication method described above.

In fact, such network node comprises a memory adapted to store time offset information and clock drift information for one or more other network nodes; transceiver operation period information (for one or more nodes) may also be stored in such memory.

BRIEF DESCRIPTION OF THE DRAWINGS

The present invention will become more apparent from the following description to be considered in conjunction with the annexed drawing, wherein:

FIG. 7 shows a neighbouring nodes table for a source node of the network of FIG. 1, FIG. 8 shows synchronization information included in an acknowledgment to a preamble transmitted by a destination node of the network of FIG. 1.

It is to be understood that the following description and the annexed drawings are not to be interpreted as limitations of the present invention but simply as exemplifications.

DETAILED DESCRIPTION OF THE INVENTION

Figure 1:
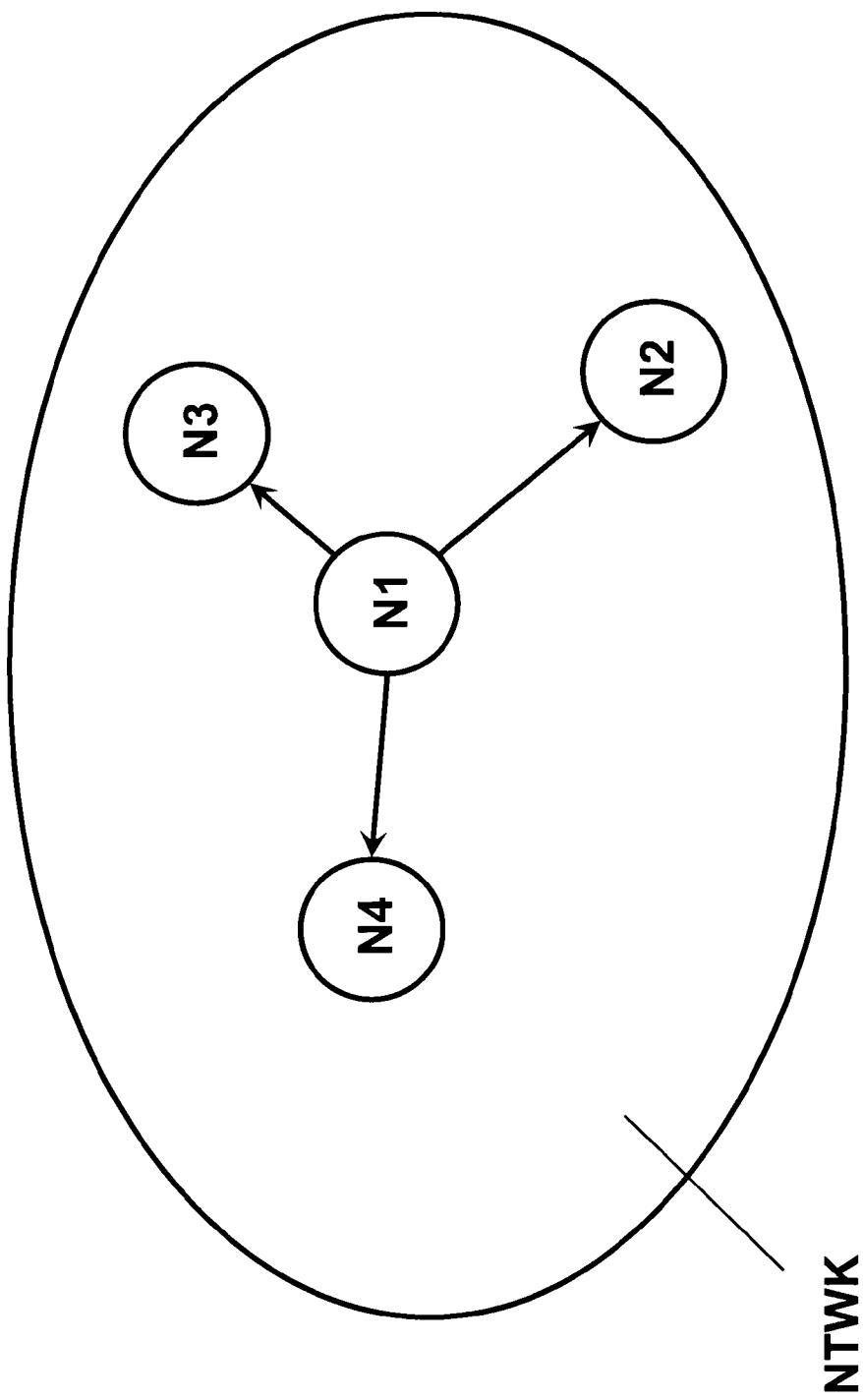
FIG. 1 shows schematically and partially an embodiment of a WPAN network, specifically a WSN network, according to the present invention.

The described embodiment of the present invention relates to a WPAN [Wireless Personal Area Network], specifically a WSN [Wireless Sensor Network] using the ZigBee technology, see FIG. 1, even if the present invention may be applied more in general to an asynchronous wireless communication network. The operation of a network node is timed by means of an own clock signal which is generated by a timer (usually a local timer) through a quartz crystal; the timer is used by the network node also for measuring the duration of time intervals. As already explained, a network is defined as "asynchronous" if its nodes do not have a synchronized clock and therefore do not transmit and receive synchronously.

In FIG. 1, only four neighbouring nodes of an asynchronous wireless communication network NTWK are shown, namely nodes N1, N2, N3 and N4; these four nodes are connected by three lines with arrows that represent communication between them. These arrows correspond to a specific situation wherein node N1 acts only as a source of information packets and nodes N2, N3 and N4 act only as destinations of these information packets; of course, this is not the general case and has been done only in view of the explanation of the present invention.

In the example of FIG. 1, all four nodes N1, N2, N3 and N4 are battery powered and use "duty-cycling", i.e. their transceivers operate intermittently according to a periodic (fixed transceiver operation period) sequence of (short) awake intervals and (long) sleep intervals.

It is to be noted that, for the purpose of the following explanation of the present invention, node N1 that acts as a source of information packets could also have a permanently operating transceiver and be e.g. mains powered.

Each network node comprises a control and processing unit (e.g. a microprocessor) associated to a memory storing a suitable computer program that determines the operation of the node including its communication. The communication application which is part of the computer program is organized according to hierarchic layers; therefore, when the communication application requires transmission of e.g. a preamble at a certain layer, this request of transmission is processed by lower layers and physical transmission of this preamble may occur only with a delay which is known not precisely but only statistically (due to the fact that many different activities are carried out by the control and processing unit in parallel), and when e.g. an acknowledgment is physically received at a node, this reception is processed first by lower layers and then passed to higher layers with a delay which is known not precisely but only statistically.

The MAC protocol used in network NTWK is based on preamble sampling and short fixed-length preambles and acknowledgements.

In short fixed-length preamble sampling protocols, the receiver (i.e. the transceiver acting as a receiver) wakes up periodically for a short time in order to sample the communication medium. The time spent by a network node in sleep state is called "sleep interval" and the time spent by a network node in awake state is called "awake interval"; the sum of any awake interval and the following sleep interval is called "transceiver operation period" and is generally fixed and predetermined; all these correspond to the operation schedule of the network node.

Figure 2:
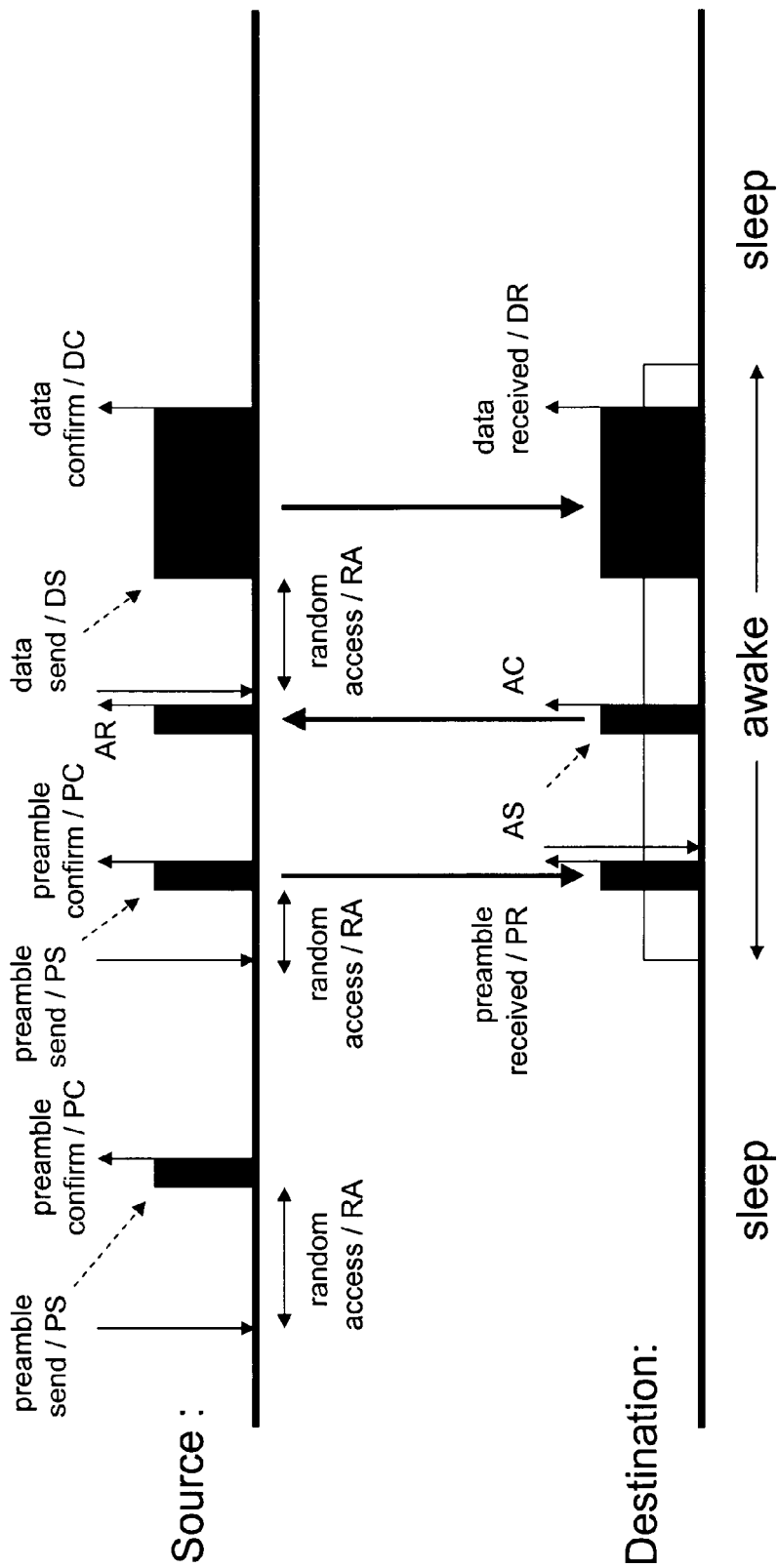
FIG. 2 shows time diagrams for the source node and for the destination node according to a short fixed-length preamble sampling technique.
Figure 3:
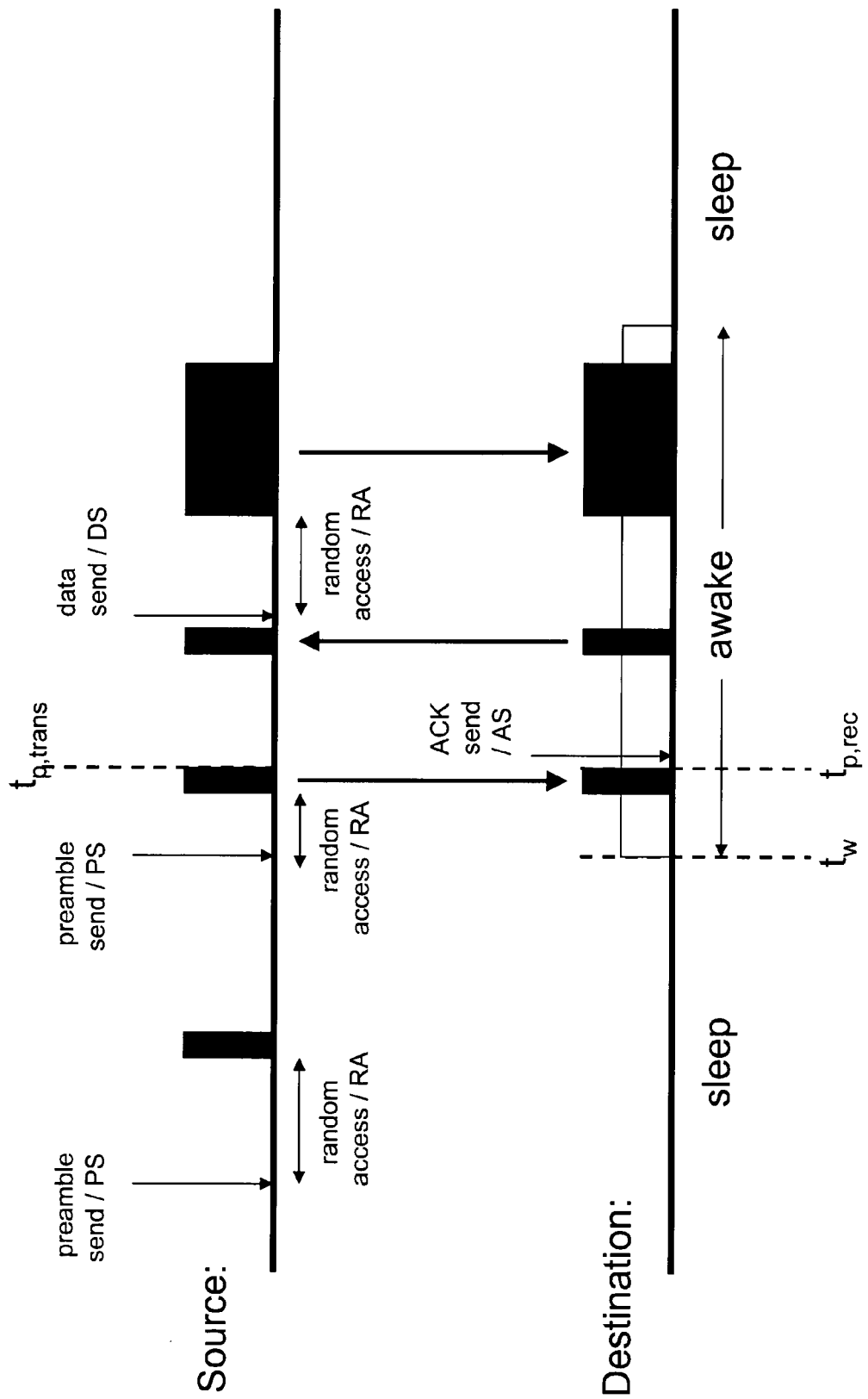
FIG. 3 shows the time diagrams of FIG. 2 wherein particular time instants are highlighting that are used according to an embodiment of the present invention.

In FIG. 2 and in FIG. 3, the following symbols are used: RA=random access, PS=preamble send, PC=preamble confirm, PR=preamble received, AS=acknowledge send, AC=acknowledge confirm, AR=acknowledge received, DS=data send, DC=data confirm, DR=data received.

With reference to FIG. 2, when a network node (Source) has an information packet to be transmitted, it physically transmits over the air a series of short preambles of the information packet, each containing an identifier of the destination node (Destination) (PS action in FIG. 2 and FIG. 3); in this way, many nodes of the network (at least the neighbouring nodes) receive the preambles. If a node that has received a preamble is not the destination node, it returns to sleep immediately. If a node that receives a preamble is the destination node, it transmits an acknowledgment (ACK) back to the source node (AS action in FIG. 2 and FIG. 3) before another preamble is transmitted by the source node. If no node replies to the preamble within a timeout (that may correspond to the maximum delay between request of transmission and physical transmission of an acknowledgment), the node transmits another preamble later (PS action in FIG. 2). Upon reception of the acknowledgement, the source node transmits the payload of the information packet (data) to the destination node (DS action in FIG. 2 and FIG. 3).

It is to be noted that in FIG. 2, small arrows pointing downwards (see PS, AS, DS) represent messages sent from an upper layer to the MAC protocol and small arrows pointing upwards (see PC, AC, DC, PR, AR, DR) represent messages sent from the MAC protocol to upper layers; for example small arrows pointing downwards may correspond to request to transmit data relating to e.g. preamble or payload and small arrows pointing upwards may correspond to confirmation that data are actually transmitted or notification that data are actually received; black boxes correspond to data received and transmitted; when a black box is present on both horizontal lines, it means that data are physically transmitted and physically received (the delay between them is extremely short and not relevant for the present invention) and the big black arrow joining the two boxes clarifies which is the transmitting entity and which is the receiving entity.

Short fixed-length preamble sampling is based on random access RA, so the time duration between sending data to the MAC layer and transmitting them over the air is random. The duration of random access interval depends on data traffic and the parameters of the MAC protocol and may be much larger than the duration of the transmission interval. When a preamble is sent to the MAC layer, there is a random delay, in addition to internal software delays, until it is actually transmitted over the air. When a preamble is received and an acknowledgment is sent back, there is again a random delay until it is actually transmitted over the air. These delays affect the choice of the values of the parameters of the communication protocol and in particular its timeouts. Since the destination node of an information packet should receive at least one preamble during an awake interval, the duration of the awake interval determines the packet successful delivery ratio. Herein it is assumed that the duration of the awake interval and the sleep interval are predetermined so that the network satisfies certain delay and reliability constraints.

The above described events occur not only according to the prior art, but may occur also according to the present invention typically at the beginning of a communication between two network nodes or later, for example if unexpected events occur to either nodes as it will be better explained in the following.

An alternative preamble sampling technique that is not excluded by the present invention (even if not preferred) would be the one using variable-length preambles.

The present invention concerns a method to reduce the energy consumption of the network nodes (especially the nodes that transmit) by learning about the time when nodes are awake or, more precisely, when awake intervals start in order to avoid or at least reduce the need of transmitting multiple preambles (when short fixed-length preambles are used) or the duration of preambles (when variable-length preambles are used).

In the following, communication between node N1 acting as a source of information and node N2 acting as a destination of information will be considered according to the present invention.

In order to avoid that node N1 transmits a plurality of preambles, node N1 has to learn when node N2 awakes; before this happens, node N1 use a traditional approach based on multiple fixed-length preamble transmissions. Such knowledge can be achieved only statistically; therefore, the knowledge by node N1 of the schedule of node N2 will never be perfect; anyway, node N1 may learn better and better as the time passes as it will be explained in the following.

In FIG. 3, three time instants are highlighted:
the instant when an awake interval starts at the destination node e.g. N2, which is labeled as "$t_w$",
the instant when a preamble is completely received at the destination node e.g. N2, which is labeled as "$t_{p,rec}$",
the instant when a preamble is completely transmitted at the source node e.g. N1, which is labeled as "$t_{p,trans}$".

To be precise, these time instants do not correspond to the time instants when the corresponding events physically occur, but to the time when these events are notified by the MAC protocol to the upper software layers; due to this reason, for example, "$t_{p,rec}$" and "$t_{p,trans}$" do not correspond exactly even if they do not differ significantly.

It is clear from FIG. 3 that, if node N1 would have transmitted the first preamble starting transmission exactly at "$t_w$", it would have transmitted only one preamble; the duration of the interval starting at "$t_w$" and ending at "$t_{p,rec}$" is a time offset between node N1 and node N2. Therefore, one of the basic ideas of the present invention is to transmit time offset information from the destination node to the source node; this may be done for example in reply to the reception of a preamble by the destination node from the source node.

If source node N1 knows this time offset with respect to the operation schedule of the destination node N2, and the period of the operation schedule of node N2, whenever in the future N1 should have a need to transmit to node N2 an information packet it can calculate the start of the next awake period of the transceiver of node N2 by adding N2's time offset to a multiple of N2's period and determine when to start transmission through its internal timer.

Anyway, the clock frequency of source node N1 is not exactly identical to the clock frequency of destination node N2; therefore, the timers of the two nodes N1 and N2 do not count exactly the same time. According to the prior art a fixed and predetermined safety margin was used in order to avoid errors in the start of transmission by the source node to the destination node. The present invention teaches a more advanced solution to this problem: another of the basic ideas of the present invention is to transmit clock drift information (in other words, information relating to the difference in clock frequencies) from the destination node to the source node; this may be done for example in reply to the reception of a preamble by the destination node from the source node.

By knowing or, better said, estimating N2's time offset, N2's operation schedule period and N2's clock drift, node N1 is able to start transmission of an information packet directed to node N2 with high precision and thus saving power.

It is worth mentioning that, if the estimations by node N1 should be completely wrong (due to e.g. an unexpected change in the operation schedule of node N2), node N1 would receive no reply to the preamble transmitted from node N2 and would transmit the preamble again later and the learning process would start again from the beginning; in this way, no data would be lost, but only some time. It is apparent that the teaching of the present invention do not decrease the robustness in the communication.

Therefore, according to the present invention, there is provided a method for transmitting an information packet from a first node (source node) to a second node (destination node) within an asynchronous wireless communication network, wherein said nodes receive respective clock signals for timing their operation, wherein at least the second node comprises a radio transceiver having an intermittent operation, said intermittent operation corresponding to a periodic sequence of awake intervals and sleep intervals, wherein when said information packet is ready to be transmitted by the first node:

the first node estimates a start time of an awake interval of the second node through at least one previous transmission of an information packet from the first node to the second node, the first node determines a transmission time based at least on said estimated start time, and the first node starts transmission of said information packet to the second node at said determined transmission time; specifically, the first node estimates said start time based on at least time offset information and clock drift information transmitted from the second node to the first node on the occasion of said at least one previous transmission, e.g. in reply to the reception of a preamble by the second node from the first node.

It is worth noting that it is not relevant whether the first node comprises a transceiver having a continuous or intermittent operation even if typically also the first node comprises a radio transceiver having an intermittent operation corresponding to a periodic sequence of awake intervals and sleep intervals (i.e. uses "duty-cycling") and periods of the operation schedule of the two nodes are the same (or almost the same); in this last case, the time offset may be considered a time offset between the operation schedule of the two nodes.

The present invention provides further advantageous features that will be apparent from the following description of an embodiment thereof.

Figure 4:
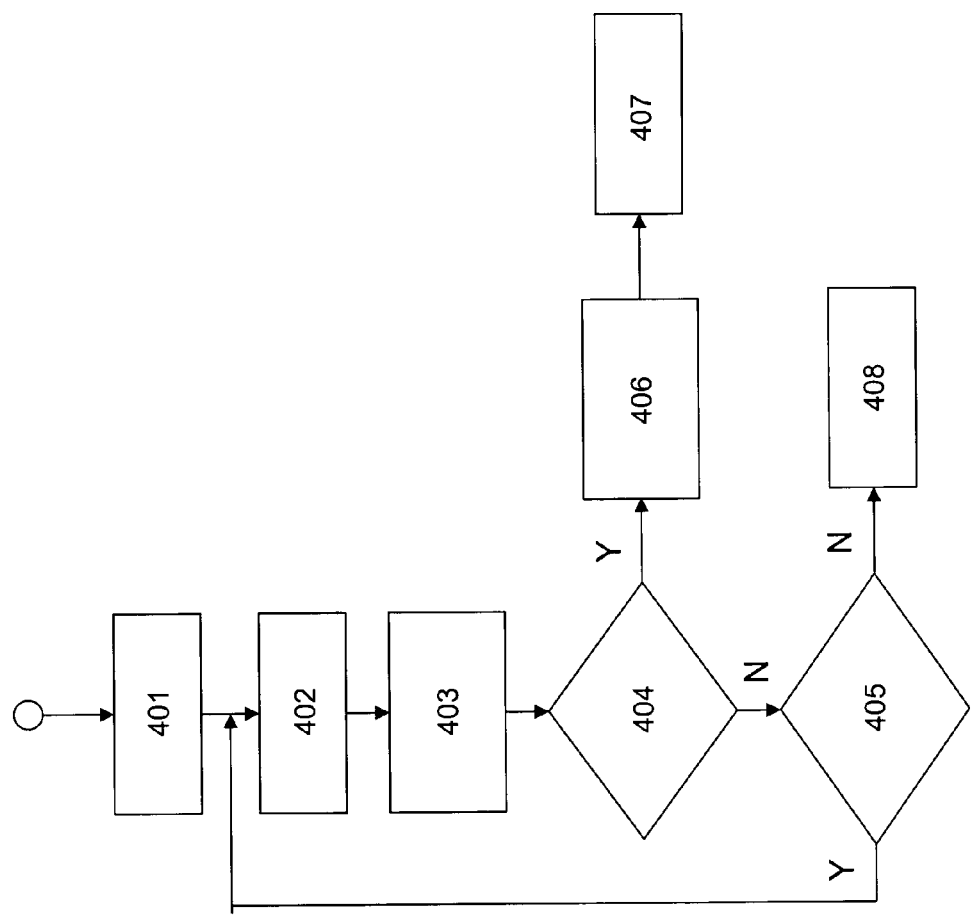
FIG. 4 shows the flowchart of a procedure carried out by a source node of the network of FIG. 1 when exchanging an information packet.
Figure 5:
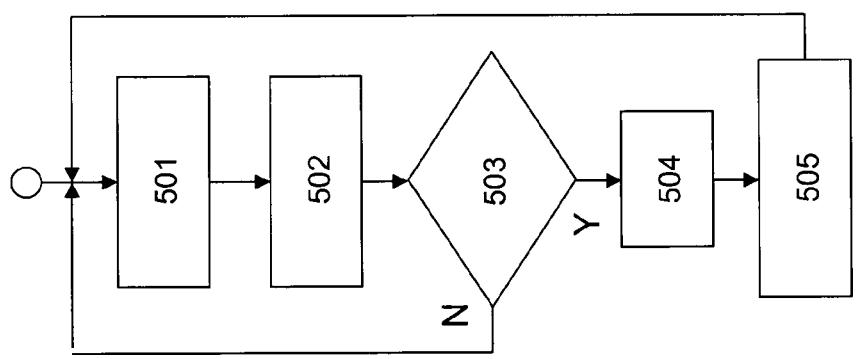
FIG. 5 shows the flowchart of a procedure carried out by a destination node of the network of FIG. 1 when exchanging an information packet.

FIG. 4 and FIG. 5 show the flowchart of the procedures carried out respectively by the source node N1 of network NTWK and the destination node N2 of network NTWK when exchanging an information packet.

With reference to FIG. 4, when a source node e.g. N1 has to transmit an information packet to a destination node e.g. N2, it estimates the next wake-up time instant (step 401 of FIG. 4), it transmits a preamble to the destination node (step 402 of FIG. 4), it receives the preamble confirmation from its internal MAC layer (step 403 of FIG. 4), it checks whether an acknowledgement is received from the destination node before a predetermined timeout has expired (step 404 of FIG. 4); if the result of the check is YES it estimates the most recent wake-up time instant (step 406 of FIG. 4) and transmits the payload of the information packet to the destination node (step 407 of FIG. 4); if the result of the check is NO it checks whether the time duration since the start of preamble transmissions is less than the maximum sleep time of the destination node; if the result of the check is YES a new preamble is transmitted (the flow continues with step 402); if the result of the check is NO a "transmission failure" message is issued by its internal MAC layer (step 408 in FIG. 4).

With reference to FIG. 5, the destination node e.g. N2 repeats a double loop; it sleeps for a "sleep interval" (step 501 in FIG. 5), it wakes up and remains awake for an "awake interval" (step 502 in FIG. 5), it checks whether it has received a preamble from any source node (step 503 in FIG. 5); if the result of the check is NO it returns to sleep (the flow continues with step 501); if the result of the check is YES it transmits an appropriate acknowledgment to the source node (step 504 in FIG. 5), then it receives the payload of an information packet from the source node (step 505 in FIG. 5) and finally it returns to sleep (the flow continues with step 501).

According to this embodiment, the first thing to be done is estimating the start of the most recent awake interval.

Figure 6:
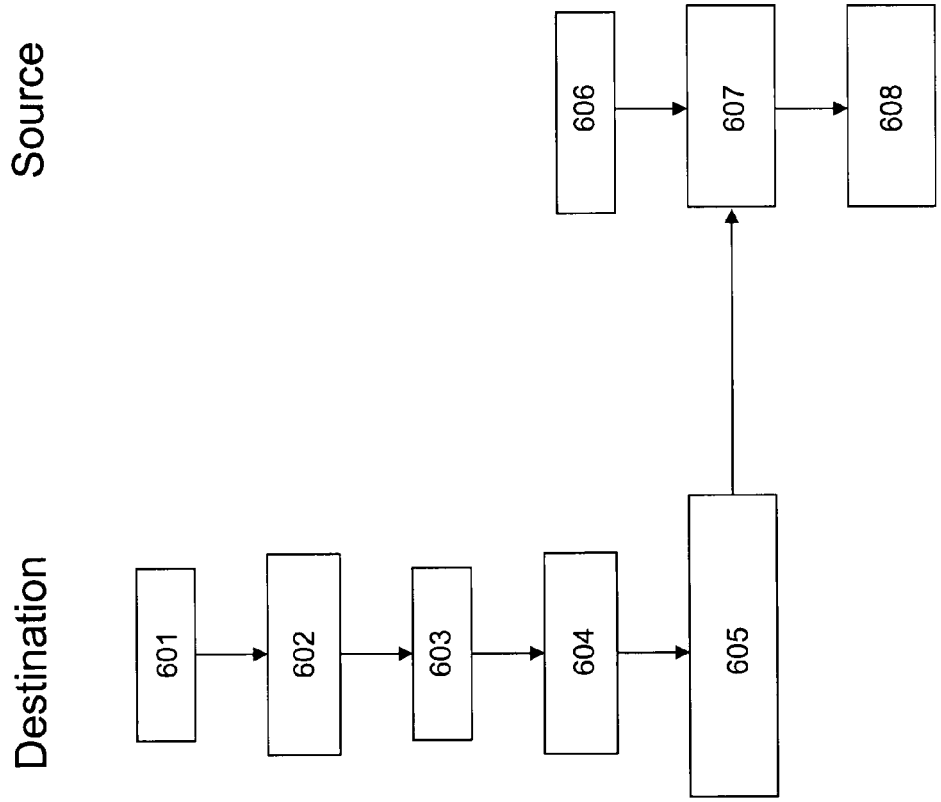
FIG. 6 shows the flowchart of a procedure for estimating the start of the most recent awake interval.

The flowchart of this procedure is shown in FIG. 6.

Let us call the start of the most recent awake interval of the destination node N2 "$t_w$" (FIG. 3); this time instant is detected and stored by the destination node N2 (step 601 in FIG. 6); the destination node N2 timestamps the instant when it receives a preamble at the layer above MAC (step 602 in FIG. 6), let us call this time by "$t_{p,rec}$" (FIG. 3); the destination node N2 computes the time difference (or duration of the time interval) between reception of this preamble and start of the most recent awake interval (step 603 in FIG. 6), let us call "$t_{d,rec}$" this difference that correspond to $t_{p,rec}-t_w$; this information is included by the destination node N2 into the acknowledgment ACK (step 604 in FIG. 6) which is then transmitted by the destination node N2 to the source node N1 (step 605 in FIG. 6).

Now the goal is to estimate $t_w$ at the transmitter side (or source node side).

When the transceiver of the source node N1 transmits the preamble, at the end of the transmission, the software layer of the source node N1 above MAC receives the confirmation for the successful transmission of the preamble, let us call "$t_{p,trans}$" (FIG. 3) this time instant; this time instant is detected and stored by the source node N1 (step 606 in FIG. 6); $t_{p,trans}$ is not necessarily equal to $t_{p,rec}$ due to the random processing time at the operating system of both the source node and the reception node even if they do not differ significantly.

Upon reception from the destination node of $t_{d,rec}$ information (step 607 in FIG. 6) which is contained in the acknowledgement ACK sent from the destination node N2 to the source node N1, the source node N1 estimates $t_w$ as $t_{p,trans} - t_{d,rec}$ (step 608 in FIG. 6).

$$\hat{t}_w = t_{p,trans} - t_{d,rec} \quad \text{(Formula 1)}$$
$$= t_{p,trans} - (t_{p,rec} - t_w)$$
$$= t_w + \varepsilon$$

(computed at step 608 of FIG. 6)

where $\varepsilon$ is a variable representing the duration of the stochastic time interval between reception of the packet at the upper layer of the destination node and source node; this stochastic variable has average value equal to E and variance equal to $\sigma^{-2}$; the parameters of this stochastic variable may be determined by carrying out a sufficient number of tests on the node.

According to this embodiment, the second thing to be done is estimating the time instant of the start of the next awake interval and the third thing to be done is determining the time instant of the start of transmission.

Figure 10:
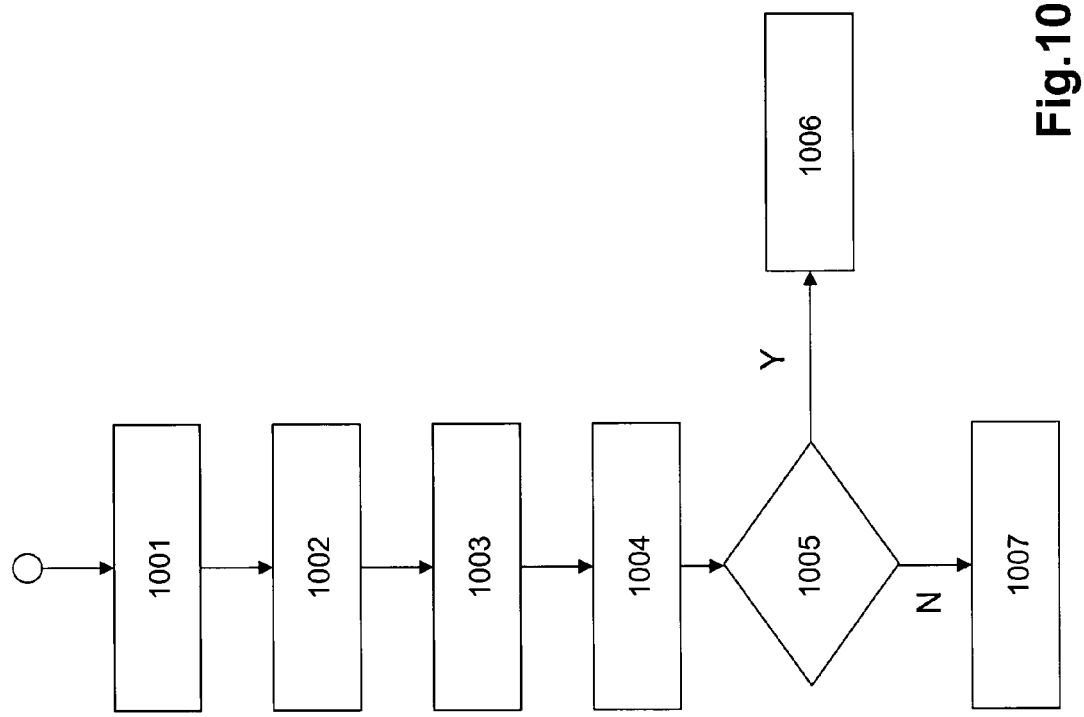
FIG. 10 shows the flowchart of this procedure used by a source node of the network of FIG. 1 for estimating the start of the next awake interval and for determining the start of transmission.

The flowchart of this procedure (i.e. estimation and determination) is shown in FIG. 10.

Such estimation by the source node N1 requires determining a certain confidence interval for the next awake interval of the destination node N2 based on the history of awake intervals of the destination node N2 and their estimations by the source node N1 (see preceding paragraphs).

The source node, for example N1, (and more in general each node of the network NTWK that needs to transmit information packets to other nodes of the network comprising a transceiver having an intermittent operation) stores information about the history of wake-up instants estimations preferably for each neighbouring node, for example N2 and N3 and N4, in a neighbouring nodes table as shown in FIG. 7.

Each neighbouring node entry of the table contains information (arranged e.g. in a row) relating to the latest "K" transmissions "w" of an information packet from the source node to the destination node; such information comprises estimations of wake-up instants immediately preceding each transmission made by the source node (indicated as $t_w^j$), measurements of the duration of the interval between consecutives wake-up instants made by the destination node (indicated as $t_w^i - t_w^{i+1}$), the operation schedule period of the destination node (indicated as P). The period is considered to be constant for a long time (even forever) and therefore only one value is stored for each entry; anyway, such a table provides for the possibility that the period may be changed from time to time by the destination node for whatever reason (for example low level of its batteries).

Preferably at each transmission "w" of an information packet from the source node, for example N1, to a destination node, for example N2, (or at least at some transmissions), appropriate information is included in the acknowledgement ACK transmitted by the destination node to the source node in reply to the reception of a preamble from the source node; at least one preamble is always transmitted by the source node to the destination node before transmitting the payload of the information packet. An example of such information is shown in FIG. 8 and comprises $t_{d,rec}^1, t_w^1 - t_w^2, P$. The period P of the destination node might not be contained in the acknowledgment ACK if it would be fixed, predetermined and known by the source node; anyway, the information shown in FIG. 8 provides for the possibility that the period may be changed from time to time by the destination node for whatever reason (for example low level of its batteries).

Based on such measured information contained in the acknowledgment ACK (indicated as $t_{d,rec}^1, t_w^1 - t_w^2$), estimations (indicated as $t_w^j$) are made at the source node e.g. N1.

Some pieces of information received from the destination node e.g. N2 (indicated as $t_w^i - t_w^{i+1}$ and P) are stored as such in the table at the appropriate row (corresponding to the destination node) and some estimations (indicated as $t_w^j$) are also stored in the table at the appropriate row (corresponding to the destination row); only the latest K transmissions from any destination node are considered and therefore the oldest data are replaced by the latest data.

It is to be noted that different but equivalent information might be included into the acknowledgment ACK and transmitted by the destination node and different but equivalent information stored by the source node in the table.

Let $t_w^j$ denote the estimated wake-up instant from the j-th latest information packet transmission by the source node e.g. N1. The acknowledgment ACK therefore always includes $t_{d,rec}$, which will then be used to estimate $t_w^1$ at the source node. The acknowledgment ACK also includes the measurement of the duration of the time interval between the latest wake-up instant and the previous wake-up instant value for which an information packet was received by the destination node from the source node, i.e. $t_w^1 - t_w^2$.

Figure 9:
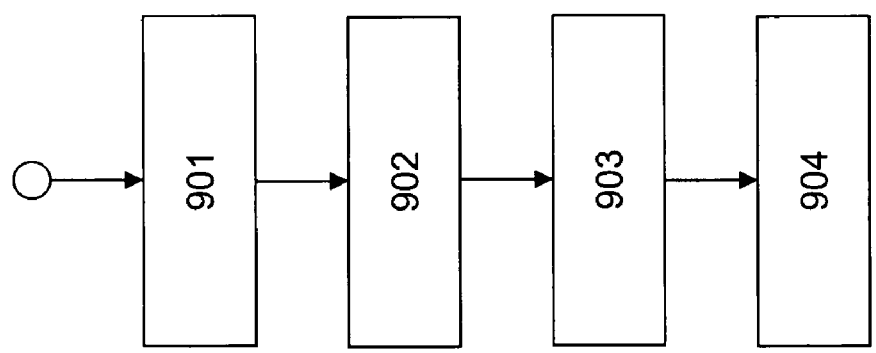
FIG. 9 shows the flowchart of the procedure used by a source node of the network of FIG. 1 in order to update the table of FIG. 7.

The flowchart of the procedure used by the source node e.g. N1 in order to update the table (FIG. 7) based on the information (FIG. 8) contained in an acknowledgment is shown in FIG. 9.

Upon the reception of the acknowledgment ACK (step 901 in FIG. 9) by the source node e.g. N1 from the destination node e.g. N2, data in the row of the table corresponding to the destination node e.g. N2 are updated: the source node e.g. N1 first replaces each entry $w_j$ by $w_{j-1}$ for $j \in [2,K]$ (step 902 in FIG. 9), then estimates $t_w^1$ (step 903 in FIG. 9) using Formula 1 (see flowchart of FIG. 6) and finally inserts $t_w^1$ and $t_w^1 - t_w^2$ and P if received) values into the neighbouring nodes table (step 904 in FIG. 9); instead of moving data within the row of the table, a pointer-shift approach may alternatively be used like for circular buffers.

There are two types of errors that should be taken into account while processing the history of wake-up instant estimations: time offset error and clock drift error.

Time offset error corresponds to variable C mentioned above. The error associated with the wake-up instant "j" estimation $t_w^j$ for each neighbour entry in the table is labelled $\varepsilon^j$ and correspond to $t_w^j = t_w^j + \varepsilon^j$.

The clock drift results from the difference in the clock frequencies of the source node and the transmitter node.

The value of the number K is to be chosen based on the frequency of packet transmissions between any two nodes and the clock frequency variation over time.

When a node wants to transmit an information packet, it estimates the next wake-up instant of the destination node (FIG. 10).

In the following, it is assumed that operation schedule period P (the sum of the awake interval and the following sleep interval) of the destination node is constant at least during between two consecutive transmissions of information packets from the source node to the destination node.

The number of periods (indicated in the following as "N") after the last wake-up instant is the integer greater than or equal to the number calculated by the following formula:

$$\frac{curr\_time - \hat{t}_w^1}{P} \qquad \text{(Formula 2)}$$

(computed at step 1001 of FIG. 10)

where curr_time denotes the time at which the information packet is ready to be transmitted. The next wake-up instant is then estimated by the following formula:

$$t_w^{\hat{0}} = t_w^{\hat{1}} + \hat{C}NP \qquad \text{(Formula 3)(computed at step 1003 of FIG. 10)}$$

where $\hat{C}$ is the estimated difference between the clock frequencies of the destination node and the source node; such estimation may be made based on the time intervals between wake-up instants and comparing the duration of these intervals as measured at the destination node as follows:

$$t_w^i - t_w^j = C(t_w^i - t_w^j) + \epsilon^i - \epsilon^j \text{ for } i,j \in [1,K]$$

$\hat{C}$ may be estimated by the following formula:

$$\hat{C} = \frac{1}{K-1} \sum_{i=1}^{K-1} \frac{\hat{t}_w^i - \hat{t}_w^{i+1}}{t_w^i - t_w^{i+1}} \qquad \text{(Formula 4)}$$

(computed at step 1002 of FIG. 10)

The goal is to find a confidence interval for $t_w^{\hat{0}}$ as $[t_w^0 - \alpha, t_w^0 + \alpha]$.

If the confidence interval for $t_w^{\hat{1}}$ is $[t_w^1 - \beta, t_w^1 + \beta]$ and the confidence interval for $\hat{C}$ is $[C-\psi, C+\psi]$, then $\alpha = \beta + NP\psi$.

For example, assuming that $\epsilon^i$ for $i \in [1,K]$ have independent normal distribution $N(0,\sigma^2)$, then the 99% confidence interval for $t_w^{\hat{1}}$ is then $[t_w^1 - 2.576\sigma, t_w^1 + 2.576\sigma]$.

Moreover, assuming that $t_w^i - t_w^{i+1} = T$ for $i \in [1, K-1]$ and $T = NP$ for the ease of calculations, then the 99% confidence interval for $\hat{C}$ is $$\left[ C - 2.576 \frac{\sqrt{2}\,\sigma}{(K-1)T},\; C + 2.576 \frac{\sqrt{2}\,\sigma}{(K-1)T} \right].$$

Therefore, $$\alpha = 2.576\sigma + 2.576 \frac{\sqrt{2}\,\sigma}{K-1} \qquad \text{(Formula 5)}$$

(computed at step 1004 of FIG. 10)

This means that if K is chosen large enough, e.g. 10, the error from the clock drift will be sufficiently compensated so that it can be ignored in the confidence interval calculation.

Since $t_w^{\hat{0}}$ is within $[t_w^0 - \alpha, t_w^0 + \alpha]$ interval with 0.99 probability, the source node should start transmitting at time instant $t_w^{\hat{0}} - 2\alpha$ (i.e. with an advance of time $2\alpha$), of course if the current time is less than $t_w^{\hat{0}} - 2\alpha$, in order to guarantee that the wake-up instant of the destination node occurs after the start of transmission by the source node.

The source node e.g. N1 checks whether the actual time is already later than time instant $t_w^{\hat{0}} - 2\alpha$ (step 1005 in FIG. 10); if YES transmission is started immediately (step 1006 in FIG. 10); if NO transmission is started at that time instant (step 1006 in FIG. 10); it is to be noted that instead of starting transmission immediately it would be possible to delay transmission for a further period P.

If the standard deviation σ is 1 msec, then the node should start transmitting about 5 msec before the estimated wake-up instant in order to guarantee that the destination node wakes up after the transmission has started with probability higher than 0.99, which is much less than the sleep time of the destination node (sleep time of a node in a WPAN/WSN network is typically in the order of the second).

Known features of MAC protocols for duty-cycled WSN networks can be found in the two articles mentioned at the beginning of the description and relating to X-MAC and WiseMAC.

Figure 11:
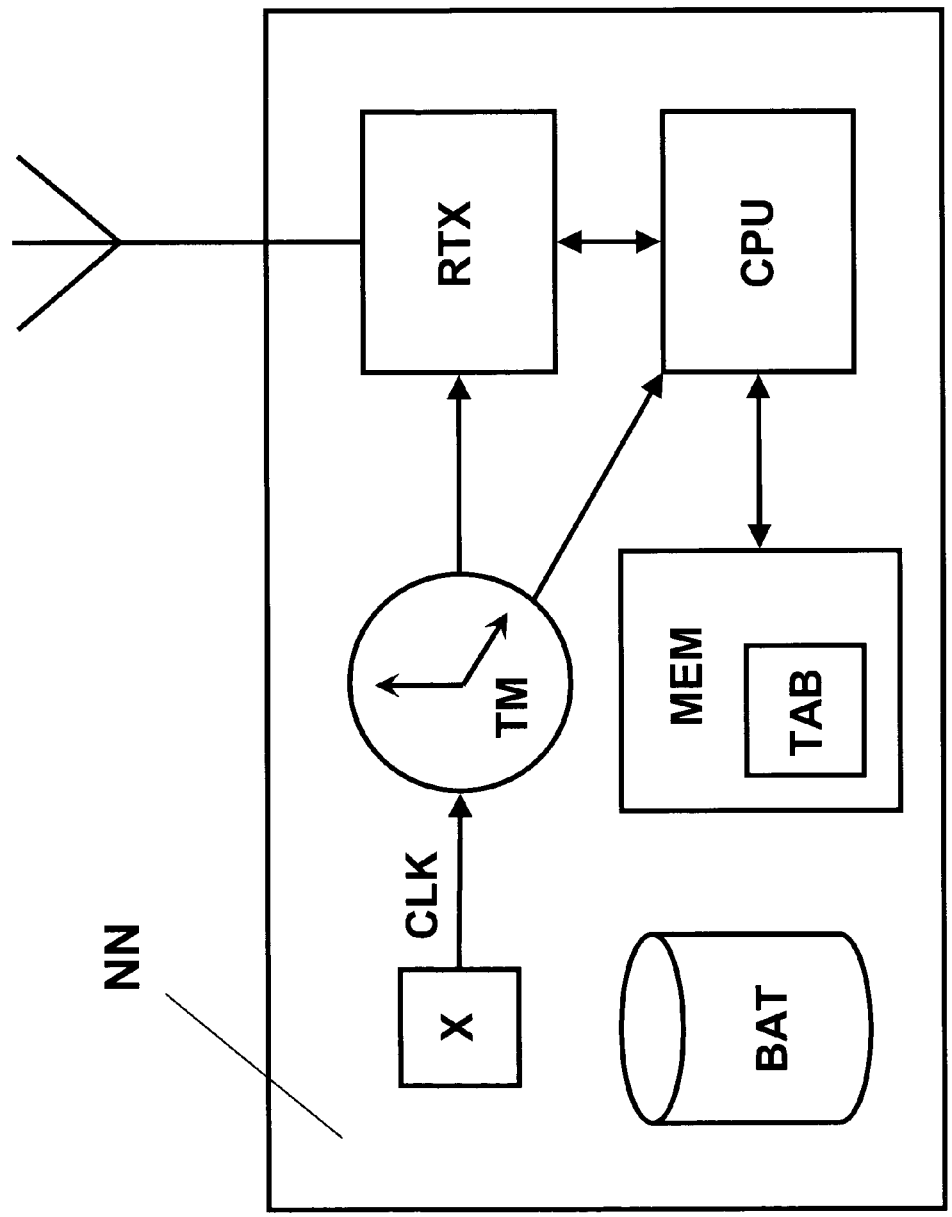
FIG. 11 shows schematically the architecture of a network node according to the present invention.

As already said, according to another aspect, the present invention relates also to a network node. FIG. 11 shows schematically the architecture of an embodiment of such a network node NN.

This node comprises a battery BAT for supplying electric power to all the circuitry of node NN.

A transceiver RTX (connected to an antenna) allows communication of node NN with other network nodes.

The duty-cycled operation of node NN is controlled by a control and processing unit CPU which is connected to the transceiver RTX; unit CPU is also connected to a memory MEM for data and programs (which may comprise a volatile section and a non-volatile section).

Memory MEM also comprises a table TAB like the one shown in FIG. 7; table TAB is adapted to store at least time offset information and clock drift information and operation schedule period information (or information derived therefrom) relating to some or all the neighbouring nodes of node NN; the content of table TAB is used by unit CPU for allowing the transmission of information packets to other network nodes in substantial synchronism with their operation schedules.

Node N comprises a timer TM receiving a clock signal CLK for timing its operation and for measuring time; clock signal CLK is generated through a quartz crystal X.

Timer TM is connected to transceiver RTX in order to determine the duty-cycled operation of node NN.

Unit CPU is connected to timer TM and memory MEM (in particular table TAB) in order to allow measurement of the duration of time intervals and the determination of time instants of transmission of information packets.

Memory M contains a program so that unit CPU will implement a transmission method according to the present invention when running this program.

The invention claimed is:

1. A method for transmitting an information packet from a first node to a second node within an asynchronous wireless communication network, wherein said nodes use respective clock signals for timing operation thereof, wherein at least said second node comprises a radio transceiver having an intermittent operation, said intermittent operation corresponding to a periodic sequence of awake intervals and sleep intervals, wherein the method comprises, when said information packet is ready to be transmitted by said first node:
   estimating by said first node a start time of an awake interval of said second node through at least one previous transmission of an information packet from said first node to said second node;
   determining by said first node a transmission time based on at least one estimated start time; and starting by said first node transmission of said information packet to said second node at the determined transmission time, said first node estimating said start time based on at least time offset information and clock drift information transmitted from said second node to said first node on occasion of said at least one previous transmission.

2. The method according to claim 1, wherein, on the occasions of transmissions of information packets from said first node to said second node, said first node receives from said second node at least time offset information and clock draft information, and wherein said first node estimates said start time through a number of previous transmissions of information packets from said first node to said second node, and based at least on said time offset information and clock drift information received.

3. The method according to claim 2, wherein said first node estimates said start time through most recent previous transmissions.

4. The method according to claim 1, wherein said start time is calculated by adding a time relating to a previous transmission of an information packet to said second node to a time offset error and to a product of a clock drift error by a period relating to said periodic sequence of said first node and by an integer number, wherein said integer is selected so that said start time is later than current time.

5. The method according to claim 1, wherein said transmission time is based also on an advance of time that takes into account confidence in estimations.

6. The method according to claim 1, wherein, on the occasions of transmissions of information packets from said first node to said second node, said first node receives from said second node at least time offset information and clock drift information and stores said received information or information derived therefrom.

7. The method according to claim 1, wherein, on the occasions of transmissions of information packets from said first node to said second node, said first node receives from said second node and stores also a period information relating to said periodic sequence of said second node, and wherein said first node estimates said start time based also on said stored period information.

8. The method according to claim 1, wherein any information packet comprises a preamble section, and wherein said time offset information corresponds to a duration of an interval between reception of a preamble section of an information packet transmitted from said first node to said second node and the start of the awake interval of said second node preceding said reception, said duration being measured by said second node.

9. The method according to claim 1, wherein said clock drift information corresponds to a duration of an interval, said interval being known to said first node and to said second node, and said duration being measured or estimated by said second node.

10. The method according to claim 9, wherein said duration is measured or estimated also by said first node, and wherein the clock drift is proportional to the ratio between the measure or estimation of said duration by said first node and the measure or estimation of said duration by said second node.

11. The method according to claim 10, wherein said clock drift is proportional to an average value of ratios corresponding to different durations.

12. The method according to claim 9, wherein said clock drift information corresponds to the duration of the interval between the start of a first awake interval of said second node during which an information packet is received by said second node from said first node and the start of a second awake interval of said second node during which a following information packet is received by said second node from said first node.

13. The method according to claim 1, wherein any information packet comprises a preamble section, said preamble section being of a fixed and predetermined duration.

14. The method according to claim 1, wherein said first node stores time offset information and clock drift information or information derived therefrom for a plurality of neighboring nodes.

15. The method according to claim 1, wherein said first node stores time offset information and clock drift information and period information or information derived therefrom for a plurality of neighboring nodes.

16. The method according to claim 1, wherein said asynchronous wireless communication network is a wireless personal area network or a ZigBee network.

17. A network node for an asynchronous wireless communication network comprising:

a timer generating a clock signal for timing its operation and for measuring time;

a transceiver adapted to receive from another network node at least time offset information and clock drift information relating to said another network node;

a memory adapted to store at least said received information or information derived therefrom;

and a control and processing unit connected to said timer and to said memory in order to determine the time of transmission of information packets to said another network node based on said stored information, wherein said control and processing unit is programmed so to carry out a method for transmitting an information packet from a first node to a second node within said asynchronous wireless communication network, wherein said nodes use respective clock signals for timing operation thereof, wherein at least said second node comprises a radio transceiver having said intermittent operation, and wherein said intermittent operation corresponds to a periodic sequence of awake intervals and sleep intervals, comprising, when said information packet is ready to be transmitted by said first node:

estimating by said first node a start time of an awake interval of said another node through at least one previous transmission of information packets from said another network node to said second node;

determining by said first node a transmission time based on at least one estimated start time; and starting by said first node transmission of said information packet to said second node at the determined transmission time, said first node estimating said start time based on at least time offset information and clock drift information transmitted from said second node to said first node on occasion of said at least one previous transmission.

18. The network node according to claim 17, wherein said memory is adapted to store time offset information and clock drift information and period information or information derived therefrom relating to said another network node received from said another network node.

19. The network node according to claim 17, wherein said memory is adapted to store synchronization information relating to one or more neighboring nodes to be used for transmission of information packets respectively to said one or more neighboring nodes.

20. The network node according to claim 17, wherein said control and processing unit is adapted to determine time offset information and clock drift information with respect to another second network node when said control and processing unit receives information packets from said another second network node, and said transceiver is adapted to transmit at least said determined information to said another second network node.

21. The network node according to claim 20, wherein said transceiver is adapted to transmit also period information to said another second network node.

* * * * *